(No Model.) 6 Sheets—Sheet 1.
P. ATKINSON.
FRICTIONAL ELECTRICAL GENERATOR.
No. 331,754. Patented Dec. 8, 1885.
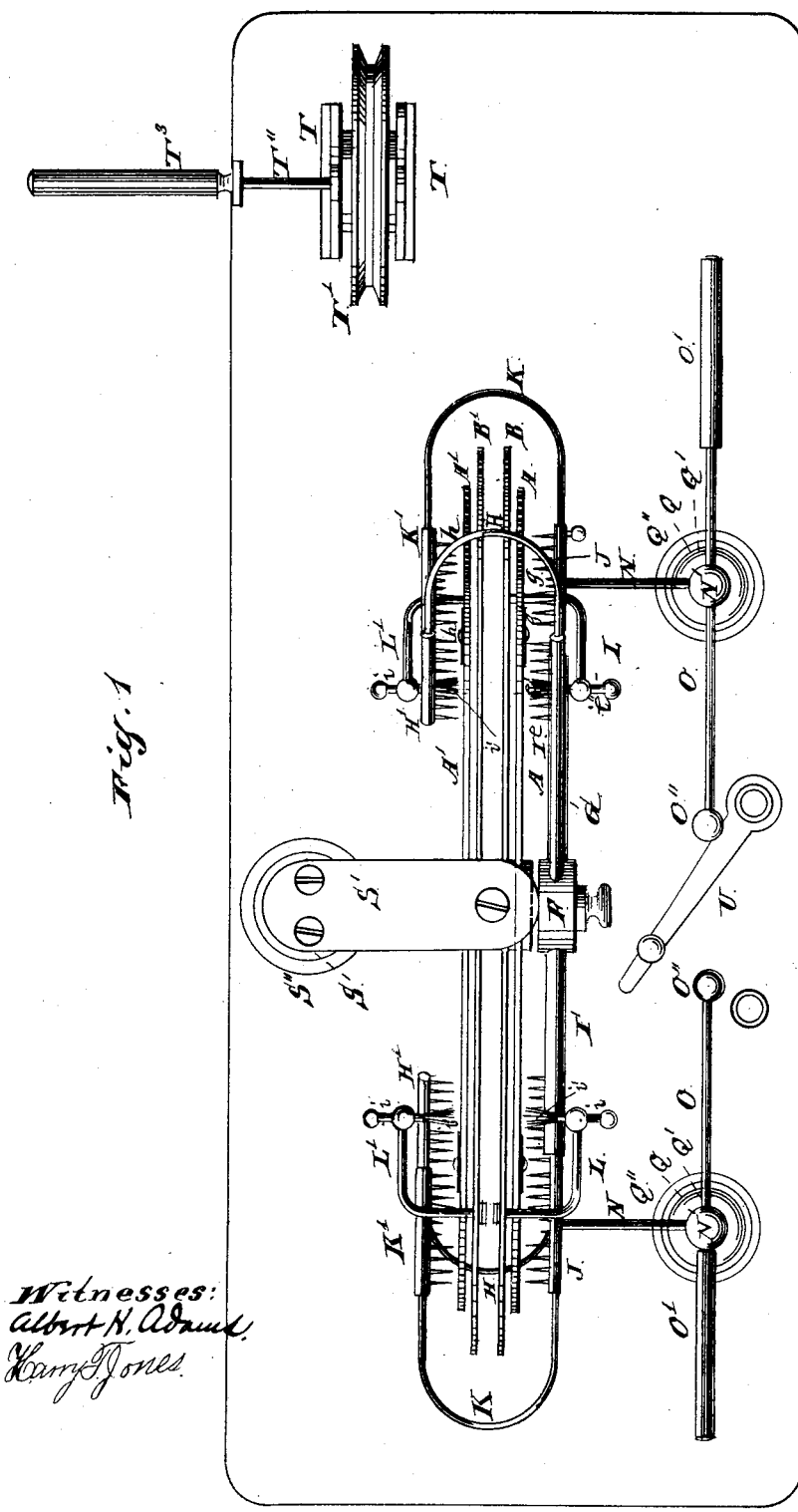

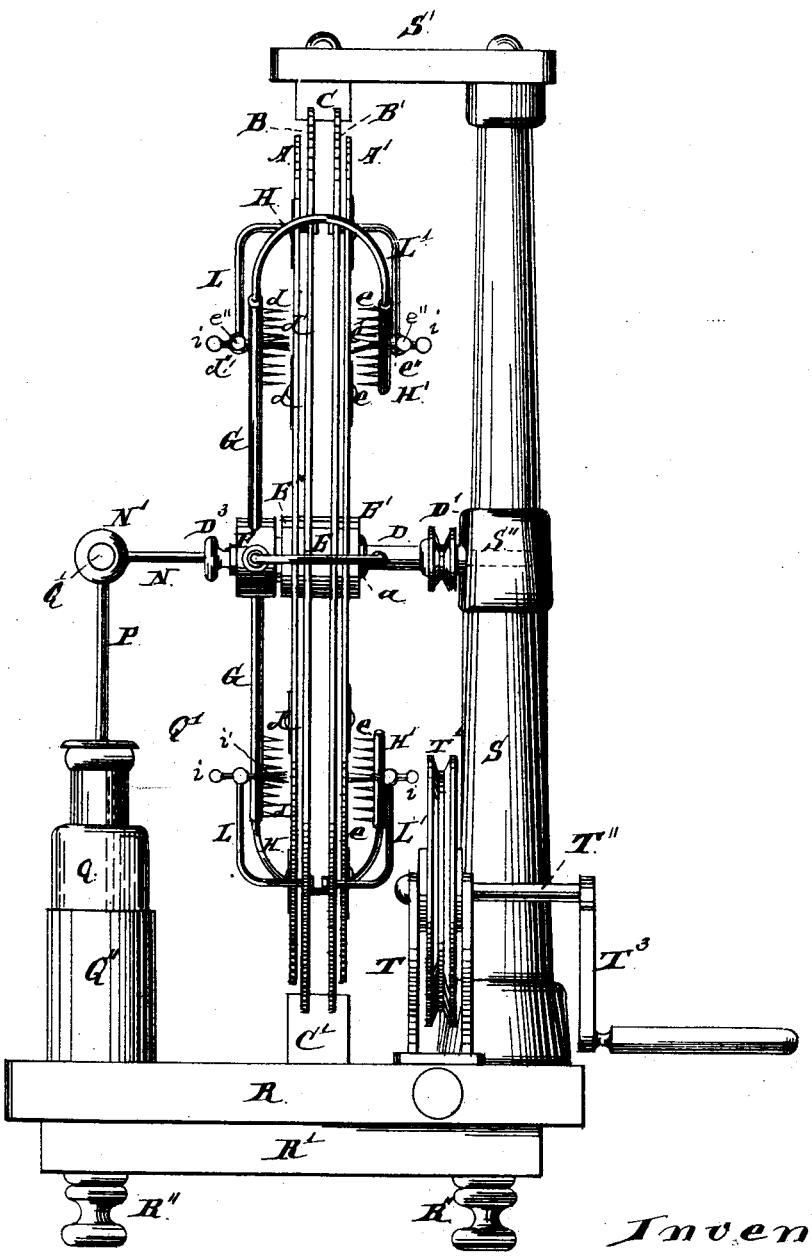

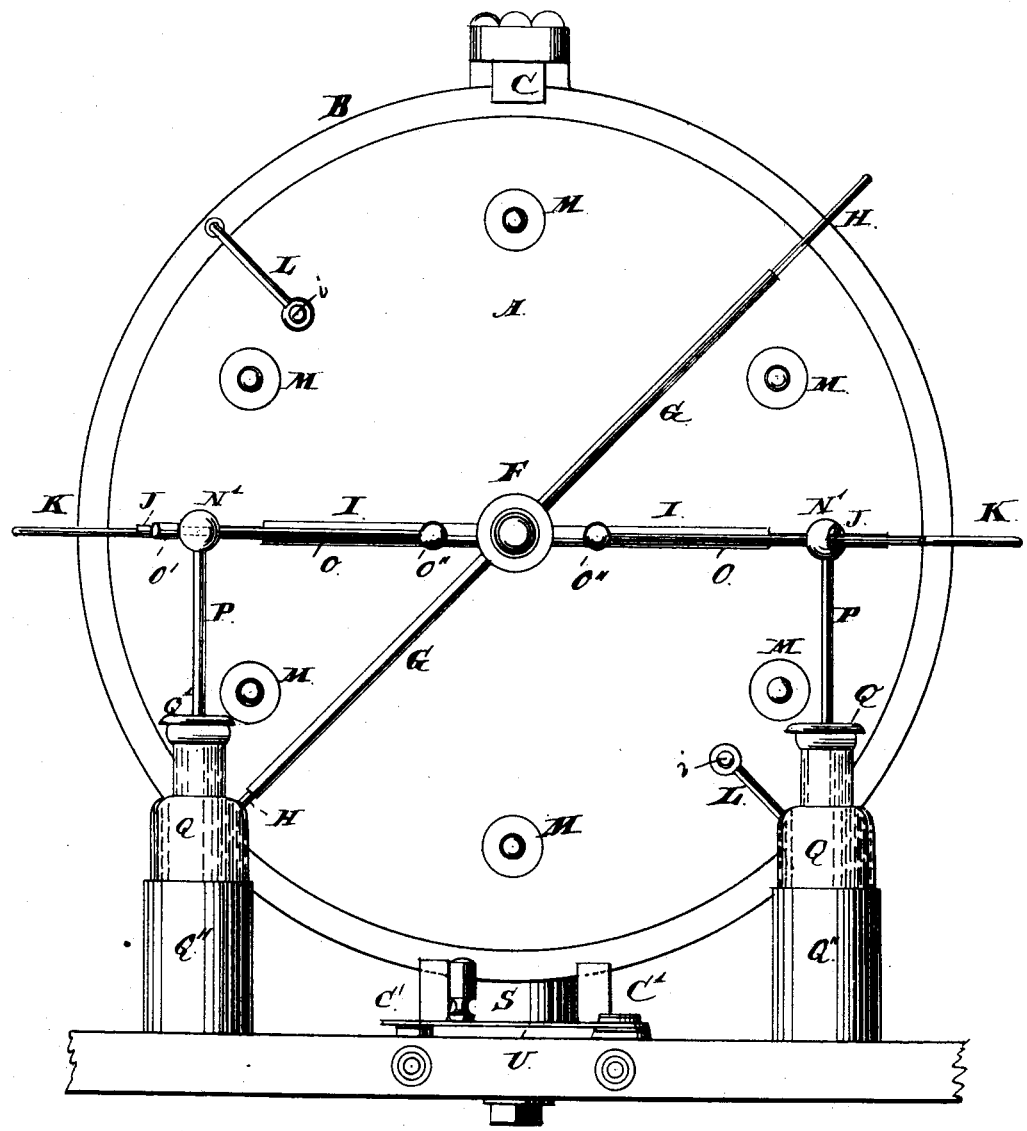

(No Model.) 6 Sheets—Sheet 4.
P. ATKINSON.
FRICTIONAL ELECTRICAL GENERATOR.
No. 331,754. Patented Dec. 8, 1885.
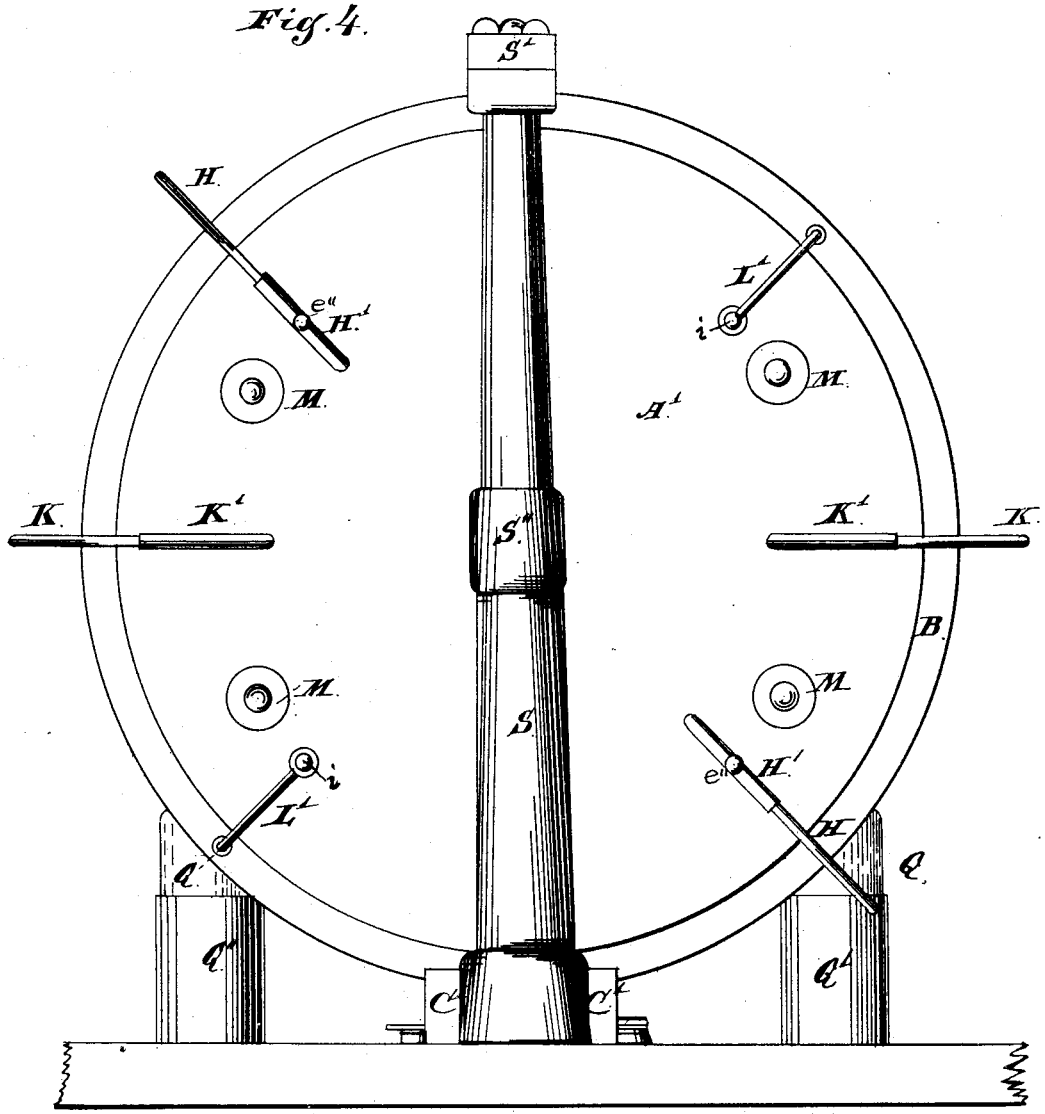
Witnesses:
Albert H. Adams.
Harry T. Jones.
Inventor:
Philip Atkinson.

(No Model.) 6 Sheets—Sheet 5.
P. ATKINSON.
FRICTIONAL ELECTRICAL GENERATOR.
No. 331,754. Patented Dec. 8, 1885.
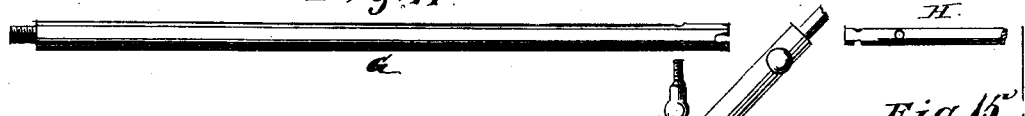
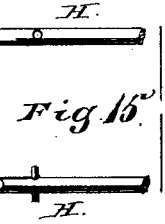
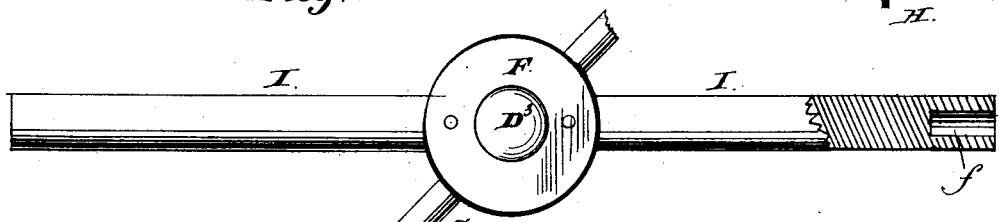
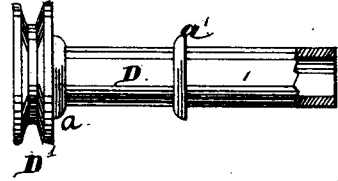
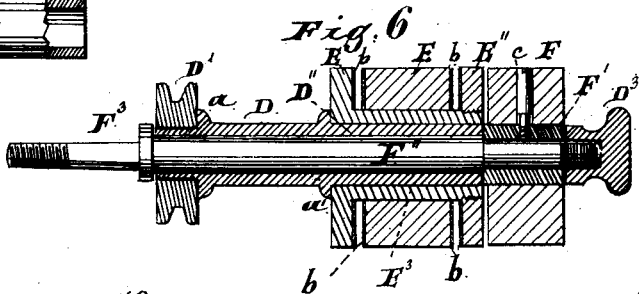
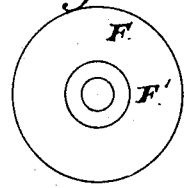
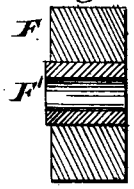
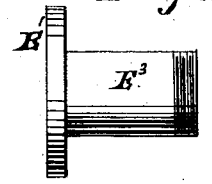
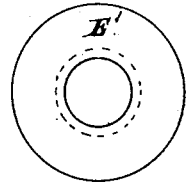
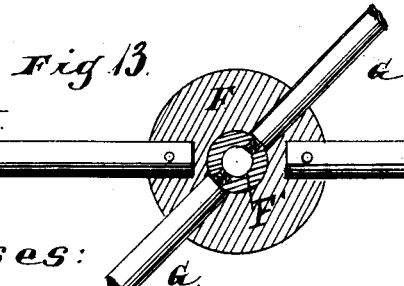
Witnesses: Albert H. Adams, Harry T. Jones.
Inventor: Philip Atkinson.

(No Model.) 6 Sheets—Sheet 6.

P. ATKINSON.
FRICTIONAL ELECTRICAL GENERATOR.

No. 331,754. Patented Dec. 8, 1885.

Witnesses:
Albert H. Adams.
Harry T. Jones.

Inventor:
Philip Atkinson.

UNITED STATES PATENT OFFICE.

PHILIP ATKINSON, OF CHICAGO, ILLINOIS.

FRICTIONAL ELECTRICAL GENERATOR.

SPECIFICATION forming part of Letters Patent No. 331,754, dated December 8, 1885.

Application filed April 16, 1885. Serial No. 162,481. (No model.)

*To all whom it may concern:*

Be it known that I, PHILIP ATKINSON, residing at Chicago, in the county of Cook and State of Illinois, and a citizen of the United States, have invented a new and useful Improvement in Frictional Electrical Machines, of which the following is a full description, reference being had to the accompanying drawings, in which—

Figure 16:
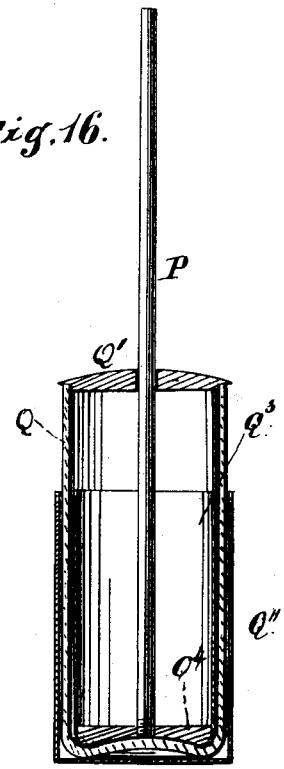
Figure 17:
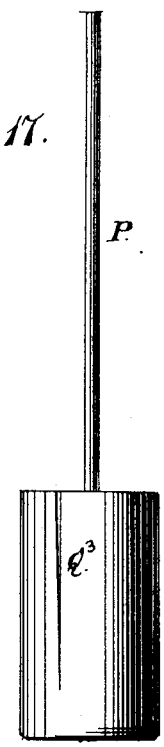
Figure 18:
Figure 19:
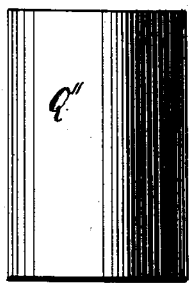

Figure 1 is a top or plan view; Fig. 2, a side elevation; Fig. 3, a front elevation; Fig. 4, a rear elevation; Fig. 5, a detail of the hub and arms carrying the comb-rods; Fig. 6, a longitudinal section of the axle and the devices for supporting the generating-disks and the comb-rods; Fig. 7, a detail showing the construction of the arbor carrying the generating disks or plates; Fig. 8, a detail of the axle for the arbor of Fig. 7; Figs. 9 and 10, details, being a face view and a section of the hub supporting the comb-rods; Figs. 11 and 12, a side elevation and a face view of the collar forming one portion of the support for the generating plates or disks; Fig. 13, a sectional elevation of the hub and supports for the comb-rods; Fig. 14, a detail of one section of the comb-rod; Fig. 15, a detail of the adjustable portion of the comb-rod; Figs. 16, 17, 18, and 19, details showing a construction of Leyden jar.

This invention relates to machines for developing static electricity, in which a stationary plate or disk and revolving plate or disk, and combs and brushes are employed for generating the electricity in quantities, and passing the generated charge to a Leyden jar or other object as may be desired, and to that class of such machines known as the "Toepler Electrical Machine;" and this invention has for its objects to improve the machine patented to me April 10, 1883, No. 275,347, in respect to the devices for producing the induced electricity, and the retention and passing of the induced current from the generating devices to the storing receptacle or jar, and to improve the construction and operation of the machine as a whole; and its nature consists in the several parts and combinations of parts hereinafter described, and pointed out in the claims as new.

In the drawings, A represents the front rotating plate or disk, and A' is the rear rotating plate or disk, each made of vulcanized rubber, glass, or other non-conducting material, and each of a diameter for the size of machine desired.

B is the stationary plate or disk to coact with the plate or disk A.

B' is the stationary plate or disk to coact with the plate or disk A', each of these plates being also made of vulcanized rubber, glass, or other non-conducting material, and each of a diameter slightly greater than that of the disks A A'. All four of the disks are of a circular form, A A' corresponding in diameter, and B B' corresponding in diameter, and the plates are located in such relation to each other as that the plates A B will coact to generate an electric current, and the plates A' B' will likewise coact.

C is a block of insulating material having in its under face two slots, one for the plate B and the other for the plate B', and in which the plates are securely held, and these plates are supported at their lower edge by blocks C', each having slots corresponding to those in the block C, the bottom of the slot of each block C' being deeper at the inner side, so as to properly receive the plates, and the slots in the blocks C C' are located at the proper distance apart for the separation of the plates B B', as required, and in order to prevent jarring in handling the machine from affecting the plates the blocks at the bottom of the slots which receive the edges of the plates may be provided with packing of some soft flexible material.

D is a collar having at one end a grooved wheel, D', keyed or otherwise firmly secured thereto, the collar having a flange, $a$, against which the face of the wheel D' abuts, and this collar has an extension, D'', which forms a box for the hub, which carries the revolving disks, the extension being separated from the collar by a flange, $a'$, in the form of construction shown.

E is the central portion of the hub carrying the generating disks or plates, which section encircles an extension, $E^3$, of a collar, E', forming one of the other sections of the hub, and this extension at its end is screw-threaded to receive a collar or nut, E'', forming the other section of the hub. This hub E E' E'' may be made of vulcanized rubber or other suitable non-conducting material, and, as shown, the adjoining faces of the sections are lined with pieces b of blotting-paper or other soft material to increase the friction or holding properties and lessen the liability of breakage in clamping the rotary disks or plates to the hub. The section E is movable on the extension E³, and when the parts are together the outer face of the collar E' abuts against the face of the flange a', and the extension E³ is of sufficient length to leave the necessary space between the sections of the hub for the reception of the rotary disks or plates.

F is a hub of vulcanized rubber or other insulating material, having a metal core or center, F', which, as shown, is held in place on the carrying-spindle by a screw, c, but may be otherwise secured to lock the hub and core to the spindle. This hub is of less width than the core F', so that the core will project beyond the face of the hub the distance required for the space between the hub F and the hub carrying the generating disks or plates, as shown in Figs. 6 and 10. This hub is mounted on the end of a metal spindle, F'', and is held endwise by a thumb-nut, D³, and this spindle has also mounted thereon the collar D and the extension D'', which carry the generating disks or plates, and, as shown, the other end of the spindle has a screw-threaded portion, F³, by which it is secured to the standard or upright of the machine.

G are arms of brass or other conducting material, which arms are located on opposite sides of the hub F and stand at an angle of forty-five degrees in relation to a horizontal plane passing through the center of the hub, and the inner end of each arm passes through the hub and is screw-threaded or otherwise secured to the metal core F', forming a connection between the core and the arms or rods G for the passage of the generating-current. Each arm or rod G has at its outer end adjacent to the face of the plate A the ordinary comb formed of a series of pins or points, d, the points or teeth being divided by an interposed brush, d', secured in the end of a handle, d'', which handle is locked in the rod or arm G by a set-screw or other suitable device, by which the handle d'' can be adjusted to or from the plate A to cause the brush to properly wipe the metal armatures on the plates as usual, these devices acting in the usual manner for machines of this class, the combs clearing the armatures on the revolving disk or plate and the brush wiping over the central raised portion of the said armatures.

H are curved rods, one for each arm G, the end of each arm having a hole to receive the end of its curved rod H, and these rods H are each curved to pass around the edges of the plates A A' and B B' and bring the end of each rod at the rear face of the plate A' to stand parallel with the plane of such plate, as shown in Fig. 2, and the outer end of each rod H is provided with the ordinary comb formed of a series of points or pins, e, divided at the center by an interposed brush, e', secured in a handle, e'', which handle passes through the end of a support or enlargement, H', on the end of the curved rod H, and the handle e'' is secured in the support H' by a set-screw or other device, so as to be adjustable forward and back to cause the brush e' to properly wipe the metal armatures on the plate A'. The support H' is attached to the end of the curved rod H by a screw-thread or otherwise, or is formed with the rod H, and this support H' carries its comb and brush adjacent to the face of the plate A' to bring the parts in proper coacting relation with the armatures on the plate A' and also in proper relation with the comb on the arm or rod G.

I are arms of vulcanized rubber or other non-conducting material, extending out from opposite sides of the hub F, so as to stand, when the parts are in working position, in a horizontal plane with the plane passing through the center of the hub. The inner end of each arm I is tapped or otherwise secured firmly in the hub, and the outer end of each arm is provided with a hole, f. These arms form, in connection with the hub, a non-conductor between the metal core of the hub and the outer end of each arm.

J are metallic bars or rods, one for each arm I, and connected with its arm by the end entering the hole f in the end of the arm I, and each bar has on the face adjacent to the plate A the ordinary comb formed by a series of pins or points, g, the center ones of which are cut down to clear the raised center of the metal armatures on the plate A, as usual.

K are curved rods, one for each bar J, and secured in the end of the bar by a set-screw or other suitable device, so as to be rigid and firm. Each rod K is curved to extend around the peripheries of the plates A A' B B', and bring the end of the rod to lie adjacent to the face of the plate A' and parallel therewith, and to this end of each rod K is attached a head or support, K', carrying an ordinary comb formed of a series of points or pins, h, the center ones of which are cut down to clear the raised center of the metal armatures on the plate A', as usual. The comb of the rod J and the comb of the head or support K' are located in coinciding planes, so that one coacts with the plate A and the other with the plate A'.

L are metal rods, the inner ends of which are attached to the disk B near the periphery, the attaching-stem passing through a suitable opening in the plate. Each rod is bent to form two arms standing at right angles, or nearly so, to each other, and these rods are attached to the plate B on opposite edges of the plate and in line with each other, and when in position for use the arm which stands parallel with the face of the plate A is at an angle of forty-five degrees, or nearly so, to a horizontal plane passing through the center of the plate, as shown in Fig. 3, and at the outer end of each rod L is a head or enlargement, as shown, through which passes a handle, $i$, carrying a brush, $i'$, to wipe the raised portion of the metal armatures on the plate A, the handle being secured in the enlargement by a set-screw or other device, so as to be adjustable forward and back to cause the brush $i'$ to properly sweep over the armatures, and corresponding arms, L, are attached to the plate B' to have the brushes $i'$, carried by such arms, sweep over the metal armatures on the plate A'.

M are metal armatures on the outer face of the disk or plate A, similar in construction to the armatures shown and described in my said Patent No. 275,347. These armatures are arranged in a circle on the face of the plate, and the combs and brushes are arranged to have the brushes wipe the raised portion of the armature, while the comb clears them.

N are arms or rods, one running out from each rod or arm J, and each having a head or enlargement, N'.

O are rods running through the heads N', and having at their outer ends an insulated portion, O', and at their inner ends a discharge-knob or ball, O'', as usual.

P is a rod running from each head N' down to and connected with the Leyden jar.

Q are the Leyden jars, each having a cover, Q', through which the rod P passes, and each supported in a cup or casing, Q'', as shown and described in my said Patent No. 275,347.

R is the base or plate supporting the several parts and having at the end, in the construction shown, a cross-bar, R', to receive legs R'', which rest on the table or other support. The supports or insulators C' extend up from the base-plate R, and the Leyden jars are attached to the bed-plate R, as shown in my said patent or in any other suitable manner.

S is a standard or post running up from the bed-plate R, and having at its upper end a cross-piece, S', to which is attached the support or insulator C, and, as shown, this post has an enlarged portion, S'', to receive the screw end $F^3$ of the spindle which carries the generating-plates.

T is a frame carrying a grooved wheel, T', mounted on an axle, T'', which axle has at its end a crank, $T^3$, by which the power is applied by driving the wheel T', and from this wheel T' a belt runs over the wheel D' to drive the rotary plates A A'.

U is a switch similar to that shown in my said patent, and for the purpose therein set forth.

The plates A A', with the armatures M, are duplicates one of the other, and the plates B B' are also duplicates of each other, and are each provided on their back with the usual paper armatures with tin-foil between the armatures and the plates, and a connecting-strip, as shown and described in my said Patent No. 275,347, and the tin-foil disks are connected with the brush-holders of the respective plates by a metal strip, as set forth in said Patent No. 275,347; and it will be seen that with the extensions H of the rods G double combs are provided for collecting purposes with the respective cylinders A A', and both leading to the metal center of the hub F; and it will further be seen that the collecting-combs on the rods J K are also duplicated and lead to a common conductor, N, for each side to each Leyden jar, and a perfect insulation between these combs and the hub F is furnished by the insulating-rods G, with which the comb-rods are connected, which insulation is one that is perfect by reason of the distance between the metal center of the hub and the ends of the rod J, produced by the great insulating-space of the rods G and hub F. The plates A A' B B' are held in proper relation to each other by the insulators C C' and the sectional hub or support E E' E'', and the extension $E^3$ of the section E' makes an insulation around the extension D'', while the projection of the metal core F' of the hub F furnishes the contact between metal surfaces with the necessary space between the hub F and the hub carrying the rotary plates.

The jar shown in Figs. 1, 2, 3, and 4 is, as before stated, similar in construction to the jar shown and described in Patent No. 275,347, and Figs. 16, 17, 18, and 19 show a construction of jar having both an exterior and interior removable coating, Q representing the jar, Q'' the exterior coating, and $Q^3$ the interior coating. The interior and the exterior coatings are made of any metal possessing rigidity sufficient to form a support and yet pliable enough to fit snugly within and around the jar to form the coating capable of being electrified or charged up in the usual manner, and the interior coating, $Q^3$, at its lower end, as shown, has a circular bottom or disk fitting the interior of the coating or cylinder, and secured thereto in any firm manner, from which bottom $Q^4$ extends up the rod P. The interior coating with the form shown in Fig. 16, having the bottom at the lower end, is split or divided at its upper end, so as to spread out to be of larger diameter than the interior diameter of the jar, and form, when inserted in the jar, the necessary close fit between the jar and the coating for operation. The support $Q^4$ for the rod P can be located near the top, in which case the split in the coating for insuring a tight fit will be at the bottom, and the interior coating and exterior coating are of the same height, so that when in position in and around the jar their upper ends will be on the same plane as is usual with the coatings for Leyden jars.

The operation is by turning the crank $T^3$ to drive the wheel T', which wheel, through the connecting-belt, drives the wheel D', rotating the disks A A', bringing the metal armatures thereon successively around to be wiped by the metal brushes, as is usual in this class of machines, and the electric charge is transferred through the combs and rods to the Leyden jars and discharged therefrom through the knobs or balls O'', as usual. The doubling of the disks, in connection with the double series of brushes and combs, enables double the quantity of electricity to be gathered on the same machine, and the arrangement of combs, brushes, and rods conducts the charge from both the disks to a common point for charging the jars, and the large non-conducting space furnished by the hub F and the arms or bars I prevents any liability of the passage of the current otherwise than in the proper direction for charging purposes.

The bottom $Q^4$ of the jars, instead of being located at the lower end of the cylinder or coating $Q^3$, could be located above the end of such cylinder or coating and not form the coating for the bottom of the Leyden jar, in which case it will be necessary for the bottom of the jar to be coated with tin-foil, as usual.

The rod P runs from the bottom $Q^4$ up through the stopple $Q'$, and when the stopple is inserted in the mouth of the jar, two points of support are given to the rod, which prevent side movement thereof, one being in the bottom $Q^4$, and the other in the stopple $Q'$, and by this means the rod is held properly centered with the jar without liability of being displaced in adjusting the rods O forward and back, and so far as furnishing a support for the rod P is concerned the coating or cylinder $Q^3$ can be made entire without any break or slot.

The extensions H are connected to the ends of the rods G by a pin passing through the part H and projecting on both sides thereof to enter openings formed in the end wall of the rod G, and the extension H is locked in position by a set-screw passing through the end of the rod G with its end engaging the face of the end of the rod H, or passing through such end, which enters the hole in G, the pins and slot maintaining the parallelism between the combs carried by the respective rods G H, and the set-screw preventing end movement and holding the parts securely together, and similar means are used for connecting the extension or rod K with the rod J.

What I claim as new, and desire to secure by Letters Patent, is—

1. The hub F, having a metallic core, F', in combination with the arms I, of non-conducting material, terminating in the hub F, and the arms G, of conducting material, terminating in the metallic core F', substantially as and for the purpose specified.

2. The arms G, carrying a comb, in combination with the curved rods H and head H', carrying a comb for connecting two combs to run to a common point, and located and operated with distinct rotary disks, substantially as and for the purpose specified.

3. The rotary disks A A' and stationary disks B B', in combination with a double series of combs and brushes carried by rods G H, and a double series of combs carried by rods J K, and a double series of brushes carried by rods L to coact with the respective disks, substantially as and for the purpose specified.

4. A hub, F, having a metal core, F', arms G, having connection with the metal core, and rods I, terminating in the hub F, in combination with the curved rods H, having head H', and curved rods K, having head K', substantially as and for the purpose specified.

5. In a Leyden jar, an interior coating, $Q^3$, slotted at one end and provided with a cross-support, $Q^4$, for carrying the rod of a Leyden jar and forming an interior lining for the jar, substantially as specified.

6. In a Leyden jar, the interior flexible support, $Q^3$, having a support, $Q^4$, in combination with a stopple, $Q'$, and rod P, for giving the rod a firm support, substantially as specified.

PHILIP ATKINSON.

Witnesses:
ALBERT H. ADAMS,
HARRY T. JONES.